3,160,564
MULTI-VITAMIN COMPOSITION CONTAINING PANTOTHENAMIDE
Edward J. Hanus, Palisade, N.J., assignor to Merck & Co., Inc., Rahway, N.J., a corporation of New Jersey
No Drawing. Filed Dec. 19, 1961, Ser. No. 160,655
1 Claim. (Cl. 167—81)

This invention relates to stable vitamin compositions and methods for preparing such compositions. More particularly, it is concerned with the preparation of vitamin compositions containing a stabilized form of pantothenic acid.

Pantothenic acid, one of the important vitamins of the vitamin B group, is a hygroscopic viscous liquid which is relatively unstable and hence not useful as a source of pantothenic acid activity in pharmaceutical preparations. Generally, the calcium salt of pantothenic acid, which is a relatively high melting solid, is used in pharmaceutical preparations since this salt is more stable than pantothenic acid itself. However, even calcium pantothenate is not especially suitable for use in multivitamin compositions since it is not stable for extended periods in such formulations. It is therefore necessary, for example in the preparation of multivitamin vitamin formulations, to include an overage of calcium pantothenate in order to insure that the product will have described pantothenic acid activity even after storage for some months.

It is an object of this invention to provide vitamin formulations containing a stabilized pantothenic acid active substance. Another object is to provide a method of preparing vitamin compositions containing a stabilized form of pantothenic acid. Other objects will be apparent from a detailed description of this invention hereinafter provided.

In accordance with the present invention, it is now found that pharmaceutical preparations wherein the source of pantothenic activity is pantothenamide are unusually stable and lose little of their pantothenic acid activity even upon extended storage under adverse conditions. Thus, the use of pantothenamide in such preparations avoids the need of including large overages of pantothenic acid and in addition provides a product having enhanced stability.

In accordance with another embodiment of this invention, it is found that when pantothenamide is incorporated in multivitamin preparations such as syrup, capsules, drops, tablets and the like, it is much more stable than salts of pantothenic acid such as calcium pantothenate. This invention therefore provides a convenient method of preparing multivitamin compositions having a stable pantothenic acid component which can be stored for extended periods of time without decomposition.

Pantothenamide is particularly useful as a source of pantothenic acid activity in various multivitamin compositions since such compositions usually have a pH of about 4–5 and the amide is very stable in this pH range. Calcium pantothenate on the other hand, is more unstable at these acidic pH's and is therefore not suitable for use under these conditions.

The following examples illustrate the new compositions and the method of preparing such compositions.

EXAMPLE 1

A liquid multivitamin formulation suitable for dispensing as drops was prepared containing the following vitamins:

| | Amount per 0.6 ml. |
|---|---|
| Vitamin A palmitate | units__ 5000 |
| Vitamin $D_2$ | do____ 1000 |
| Thiamine HCl | mg__ 1 |
| Riboflavin | mg__ 0.8 |
| Niacinamide | mg__ 10 |
| Pyridoxine HCl | mg__ 1 |
| Ascorbic acid | mg__ 50 |
| Cyanocobalamin (crystalline) | mcg__ 5 |

The formulation was prepared in accordance with methods known in this art and contained in addition to the above-listed vitamins, sorbitol solution 70%, deionized water, polyethylene oxide sorbitan mono-oleate (Tween 80), ethylenediaminotetraacetic acid disodium calcium salt (Sequestrene $Na_2Ca$), iron peptonate, an antioxidant combination of butylated hydroxy anisole, propyl gallate, and citric acid dissolved in propylene glycol (Tenox II), sodium sucaryl, sodium saccharin, methyl and propyl paraben, flavors and propylene glycol. The final pH of the formulation was about 4.

Two batches of the above-described multivitamin preparation were prepared; one containing d-calcium pantothenate in an amount equivalent to 5 mg. per 0.6 ml. drop and the second d-pantothenamide in an amount equivalent to 5 mg. per 0.6 ml. drop. Samples of the two batches so prepared were subdivided into 10 ml. amber screw cap bottles, flushed with nitrogen, sealed with natural polyethylene polyseal caps and stored at room temperature, 40° C. and 45° C. The stored preparations were assayed at intervals for pantothenic acid content and the results recorded in the following table:

| Preparation | d-Calcium Pantothenate | | | | | | d-Pantothenamide | | | | | |
|---|---|---|---|---|---|---|---|---|---|---|---|---|
| Storage Temperature | R.T.* | | 40° C. | | 45° C. | | R.T.* | | 40° C. | | 45° C. | |
| Assay | mg./ml. | Percent Loss | mg./ml. | Percent Loss | mg./ml. | Percent Loss | mg./ml. | Percent Loss | mg./ml. | Percent Loss | mg./ml. | Percent Loss |
| Initial | 4.93 | | 4.93 | | 4.93 | | 5.03 | | 5.03 | | 5.03 | |
| 2 Months | | | 2.80 | 43 | 2.13 | 57 | | | 5.08 | 0 | 5.07 | 0 |
| 3 Months | 4.03 | 18 | 1.73 | 65 | 1.09 | 78 | 4.96 | 1.4 | 3.6 | 28 | 3.12 | 38 |

*Room Temperature.

Thus, in this multivitamin preparation the d-pantothenamide is much more stable upon storage than d-calcium pantothenate.

EXAMPLE 2

Uncoated multivitamin tablets were prepared in accordance with methods known in this art. The composition of the tablets was as follows.

| Ingredient: | Amount per tablet, mg. |
|---|---|
| Cyanocobalamin in mannitol | 5.0 |
| Vitamin A and D crystalets | 44.0 |
| Thiamine mononitrate | 6.25 |
| Riboflavin | 10.8 |
| Niacinamide | 52.5 |
| Pyridoxine HCl | 1.1 |
| Ascorbic acid | 70.8 |

| Ingredient: | Amount per tablet, mg. |
|---|---|
| Sodium ascorbic acid | 106.1 |
| Folic acid | 5.3 |
| Lactose | 50.0 |
| Magnesium stearate | 4.5 |
| d-Calcium pantothenate | 5.1 |

A second batch of uncoated multivitamin tablets was similarly prepared containing 5.0 mg. of pantothenamide per tablet in place of the d-calcium pantothenate.

The stability of the pantothenic acid components in the two batches of tablets was then compared by assaying the tablets after storage (1) at 50° C. at 50% relative humidity for three weeks, (2) at room temperature for two months, (3) at 45° C. for two months, (4) at 45° C. for three months, and (5) at room temperature for 29 months. The results are shown in the following table:

| Storage Data | | d-Calcium Pantothenate | | d-Pantothenamide | |
|---|---|---|---|---|---|
| Temp. | Time | mg./cc. | Percent Loss* | mg./cc. | Percent Loss* |
| Initial | | 4.2 | | 4.95 | |
| 50° C. 50% RH/3 wks | | 1.95 | −54 | 3.61 | −28 |
| 45° C./2 months | | 3.45 | −18 | 4.52 | −9 |
| RT/3 months | | 4.35 | 0 | 4.88 | −1 |
| 45° C./3 months | | 3.29 | −22 | 4.43 | −10 |
| RT/29 months | | 2.98 | −30 | 4.69 | −5 |

RT is Room Temperature.
RH is Relative Humidity.
*Percent Loss computed from Initial Assay.

The stability of the pantothenamide component in the multivitamin tablets is strikingly illustrated in the results of the storage for 29 months at room temperature, the pantothenamide preparation losing only 5% of its original activity whereas the d-calcium preparation lost 30% of its original activity.

EXAMPLE 3

A typical multivitamin syrup was prepared in accordance with procedures known in this art. This composition of the vitamins in this syrup was as follows.

| Ingredient: | Amount per 5 ml. |
|---|---|
| Vitamin A palmitate | units__ 5000 |
| Vitamin $D_2$ | do____ 1000 |
| Riboflavin | mg__ 1.2 |
| Niacinamide | mg__ 20.0 |
| Thiamine HCl | mg__ 3.0 |
| Pyridoxine HCl | mg__ 1.0 |
| Vitamin $B_{12}$ in mannitol | mcg__ 5.0 |
| Ascorbic acid | mg__ 50 |
| Sodium ascorbate | mg__ 50 |
| d-Calcium pantothenate | mg__ 25 |

This formulation was prepared containing, in addition to the above-noted vitamins, methyl and propyl paraben, iron peptonate, Sequestrene $Na_2Ca$, Tenox II, enzyme converted corn syrup (Veltose 165), sucrose, sorbitol solution (70%), propylene glycol, acacia, Tween 80 and deionized water.

A second syrup was prepared in the same way containing 25 mg. per 5 ml. of pantothenamide in place of the d-calcium pantothenate.

The two syrups were then subdivided into 10 ml. amber screw cap bottles, flushed with nitrogen, sealed with natural polyethylene polyseal caps, stored at 40 and 45° C., and assayed for pantothenic acid activity periodically.

After four months at 40° C. the syrup containing d-calcium pantothenate showed 85% loss of pantothenic acid activity, whereas the pantothenamide containing syrup showed only 6% loss of activity. After four months at 45° C., the d-calcium pantothenate lost all its pantothenic acid activity whereas the d-pantothenamide formulation lost only 10% of its original pantothenic acid activity.

EXAMPLE 4

The stability of pantothenamide and d-calcium pantothenate were compared at concentrations of 3.0 mg./ml. in phosphate-citrate buffers at about pH 4 and 5 preserved with methyl p-hydroxybenzoate and propyl p-hydroxybenzoate. The buffered solutions were assayed periodically for pantothenic acid content and the results tabulated in the following table.

| pH | Storage Time | d-Calcium Pantothenate | | | | d-Pantothenamide | | | |
|---|---|---|---|---|---|---|---|---|---|
| | | RT | | 45° C. | | RT | | 45° C. | |
| | | mg./cc. | Percent Loss* | mg./cc. | Percent Loss* | mg./cc. | Percent Loss* | mg./cc. | Percent Loss* |
| 4 | Initial | 2.79 | | 2.79 | | 3.02 | | 3.02 | |
| | 1 month | | | 1.59 | −43 | | | 3.09 | 0 |
| | 1.5 months | | | 1.42 | −49 | | | 3.04 | 0 |
| | 2 months | 2.70 | −3 | 1.13 | −59 | 2.99 | 0 | 3.03 | 0 |
| | 6 months | 2.77 | 0 | | | 3.12 | 0 | | |
| | 12 months | 2.23 | −20 | | | 3.11 | 0 | | |
| 5 | Initial | 3.27 | | 3.27 | | 3.11 | | 3.11 | |
| | 1 month | | | 2.78 | −15 | | | 2.94 | −5 |
| | 1.5 months | | | 2.00 | −39 | | | 2.97 | −4 |
| | 2 months | 3.21 | −2 | 1.98 | −39 | 3.05 | −2 | 2.92 | −6 |
| | 6 months | 2.96 | −10 | | | 3.01 | −3 | | |
| | 12 months | 2.27 | −31 | | | 3.07 | −1 | | |

*Percent loss computed from Initial Assay.

The assay method used for the determination of calcium pantothenate and pantothenamide involved the hydrolysis of these substances to β-alanine and alanine amide, and the colorimetric determination of these latter products via the ninhydrin reaction for amino acids. This assay was carried out as follows:

*Reagents*

(1) Dowex 50–X4 (H-type) 100–200 mesh.
(2) Florisil (60–100 mesh).
(3) Phenol solution—dissolve 80 g. of reagent grade phenol in 20 cc. absolute ethanol with gentle heating. Shake, after cooling, with 1 g. Dowex 50–X4, for 20 minutes, allow to settle and decant solution.
(4) Cyanide-pyridine reagent—2 cc. of a 0.01 M solution KCN (freshly prepared) are diluted to 100 cc. with ammonia-free pyridine (prepared by shaking 100 cc. pyridine with 1 g. Dowex 50–X4 [H-type] 20 minutes).
(5) Ninhydrin solution—dissolve 0.5 g. 1,2,3-triketohydrindene in 10 cc. absolute ethanol.

*Procedure:* The sample is prepared by dissolving a weighed quantity of a finely powdered sample or by diluting a measured volume of liquid to an appropriate volume. An aliquot of this solution, containing between 2–3 mg. of pantothenates or pantothenamide in not more than 25 cc. $H_2O$ is placed on a column of about 12 mm. diameter and 30 cm. long fitted with a stopcock. The column is prepared by placing a small pledget of glass wool in the bottom, adding about 5 cm. Florisil, pledget of glass wool, 3 cm. Dowex 50–X4, glass wool. Thoroughly wash the column with $H_2O$ before adding sample.

The solution is regulated to a flow at a rate of about 0.5 cc./minute until no liquid remains on top, into a 100 cc. volumetric flask. The column is then rapidly eluted with enough water to make a volume of about 40 cc. in the flask.

Add 2.5 cc. of 0.5 N NaOH and heat in boiling water bath for 1 hour to ensure complete hydrolysis.

Cool, add one drop of phenolphthalein TS, and titrate with 1 N $H_2SO_4$ to a colorless end point. Add 2 drops in excess.

Pipette 50 cc. of absolute ethanol into the flask, mix and bring to volume with $H_2O$.

Place 2 cc. of this solution into a 10 cc. volumetric flask, add 1 cc. of phenol reagent, swirl, add 1 cc. of KCN-pyridine reagent, swirl, and heat 1 minute (timed) in a boiling water bath. CAUTION—temperature is very critical and must be adhered to. Swirl during heating.

Add 0.2 cc. ninhydrin reagent, stopper the flask securely by twisting, and heat 5 minutes in the water bath.

Cool to room temperature and dilute to volume with 60% v./v. ethanol.

A standard containing a known quantity (2–3 mg.) of pantothenate or pantothenamide is placed on the same type column as used for the sample and subjected to the same procedure.

A reagent blank (2 cc. of 60% v./v. ethanol) is color developed in the same manner as sample and standard.

The photometer is set at 0 absorbance at 570 m$\mu$ with the reagent blank and readings of sample and standard are taken.

*Calculation*

$$\frac{OD_?}{OD_{std}} \times \text{conc. STD in mg.} \times \text{dilution factor} = \text{mg. in sample}$$

In assaying of syrups, an aliquot of syrup equivalent to 15 mg. of calcium pantothenate or 30 mg. of pantothenamide is pipetted into a 25 ml. volumetric flask and made to volume by rinsing the pipette with water. A 10 ml. aliquot of the solution is added to a 50 ml. centrifuge tube containing 8 g. of ammonium sulfate. The tube is capped shaken for five minutes. Twenty ml. of benzyl alcohol is then added and the tube is shaken again for 15 minutes. The tube is centrifuged and 10 ml. of the benzyl alcohol extract removed and added to second 50 ml. centrifuge tube containing 10 ml. of toluene. Fifteen ml. of water is pipetted into the tube and the mixture shaken vigorously for 15 minutes. The tube is centrifuged and a 10 ml. aliquot of the water layer is removed and placed on the resin column described above. A standard is treated simultaneously exactly as described above.

Various changes and modifications of the invention can be made, and to the extent that such variations incorporate the spirit of this invention, they are intended to be included within the scope of the appended claim.

What is claimed is:

A stable aqueous multivitamin composition comprising vitamin A, vitamin $D_2$, thiamine, riboflavin, niacinamide, pyridoxine, ascorbic acid, cyanocobalamin and pantothenamide, said multivitamin composition having a pH adjusted between 4 and 5.

References Cited in the file of this patent

UNITED STATES PATENTS

| | | |
|---|---|---|
| 2,369,839 | Moore | Feb. 20, 1945 |
| 2,519,462 | Harris | Aug. 22, 1950 |

OTHER REFERENCES

Jenkins: The Chemistry of Organic Medicinal Products, 1957, John Wiley and Sons, Inc., N.Y., N.Y., pages 247.

Jordan: Modern Drug Encyclopedia, seventh edition, 1958 Drug Publications Inc., N.Y., N.Y., pages 1072 and 1073.